INVENTOR
ROBERT W. DRUSHEL

BY

ATTORNEY

United States Patent Office 3,471,750
Patented Oct. 7, 1969

3,471,750
CIRCUIT FOR AND METHOD OF CONTROL SIGNAL GENERATION IN RESPONSE TO A TRANSIENT SIGNAL
Robert W. Drushel, Farmington, Mich., assignor to Ex-Cell-O Corporation, Farmington, Mich.
Filed Nov. 17, 1966, Ser. No. 595,189
Int. Cl. H02h *1/04, 7/00, 3/22*
U.S. Cl. 317—49
16 Claims

ABSTRACT OF THE DISCLOSURE

A circuit for and method of providing a control signal output substantially immediately on occurrence of a transient signal in a power line or the like and maintaining the control signal output for a predetermined time after the transient signal has initially changed polarity is disclosed. The transient signal is first sensed through a transformer and bridge rectifier, followed by an emitter follower, so that the transient signal is substantially immediately presented in unaltered form at a ripple compression and current change isolation circuit in which the transient signal is separated from other extraneous signal components. Separate positive portion signal detector circuits are then utilized to receive the output signal from the ripple compression and current change isolation circuit and provide a control signal output substantially immediately on occurrence of the first positive excursion of the transient signal and for a predetermined time after the transient signal has started the first negative excursion thereof. The control signal output is then maintained by a separate negative portion signal detector circuit during the first negative excursion of the transient signal and for a predetermined time thereafter. The ripple compression and current change isolation circuit includes a pair of cathode followers having common emitters connected through a Zener diode one of which has a short time constant input circuit and the other of which has a long time constant input circuit. The positive portion signal detector circuits include a semi-conductor valve having a long time constant input circuit and a short time constant input circuit in parallel. The negative portion signal detector circuit is in parallel with the other input circuits of the semi-conductor valve, is operable in response to a negative going signal, and includes a predetermined time constant circuit for determining cut-off time of the control signal output.

---

In many electric circuits, such as industrial power line circuits and the like, transient signals are common. Thus electric signals on power lines may increase or decrease momentarily due to non-recurring phenomena, such as for example the turning on or off of electrical equipment connected to the power lines. These transient signals are particularly undesirable when apparatus connected to the power lines have protective circuits for shutting down the apparatus in response to changes in the power signal input to the apparatus.

Thus, for example, in the case of electro-chemical machining apparatus having electronic control circuits in conjunction therewith, as for example disclosed in application Ser. No. 585,395, filed Oct. 10, 1966 the electro-chemical machining apparatus is shut down in response to undesirable variations in the electric signal in the cutting circuit which could be due to a line transient signal rather than an undesirable cutting condition. Further, with apparatus for electro-chemical machining, it is often difficult or impossible to shut down and restart the apparatus without damaging work being machined.

There is therefore a need for a control circuit which will sense a transient signal in an electric circuit and put out a control signal substantially immediately on sensing of the transient signal effective to prevent operation of a machine control circuit, such as disclosed in the above referenced patent application for the duration of the transient signal. That is to say, if an undesirable circuit condition sensed by a machine control circuit is due to a transient signal in the power line, the apparatus controlled by the machine control circuit should ordinarily not be shut down in response thereto.

It is therefore one of the objects of the present invention to provide an improved electronic control circuit.

Another object of the invention is to provide means for and a method of sensing a transient signal in an electric circuit and for providing an output signal substantially immediately in response thereto for the full period of the transient signal and a predetermined time thereafter.

Another object is to provide means for and a method of sensing a transient signal in a power line or the like along with extraneous signals, isolating the transient signal with respect to the extraneous signals and providing an output signal in response to the transient signal substantially immediately on occurrence of the transient signal and for the duration of the transient signal and a predetermined time thereafter.

Another object is to provide means for producing an output signal in response to a transient signal and for a predetermined time thereafter, including means for sensing the transient signal, means for producing an output signal in response to a positive going signal, a short time constant circuit for conducting positive going portions of the sensed transient signal substantially immediately between the means for sensing the transient signal and the means for producing an output signal in response to the leading edge of the transient signal, a long time constant circuit in parallel with the short time constant circuit for maintaining the output signal from the means for producing an output signal for the duration of the positive going portion of the transient signal and for a predetermined time thereafter, and means for providing a positive going signal to the means for producing an output signal in response to a negative going portion of the sensed transient signal within said predetermined time and for a predetermined time after the negative going portion of the sensed transient signal.

Another object is to provide an electronic control circuit as set forth above in conjunction with electro-chemical machining apparatus or the like for preventing turning off of the electro-chemical machining apparatus due to a transient power line signal.

Another object is to provide a means for and method of providing an output control signal in response to a transient electric signal as set forth above which is simple, economical and efficient.

Other objects and features of the invention will become apparent as the description proceeds, especially when taken in conjunction with the accompanying drawings, illustrating a preferred embodiment of the invention, wherein.

With particular reference to the figures of the drawings, one embodiment of the present invention will now be considered in detail.

Figure 1:
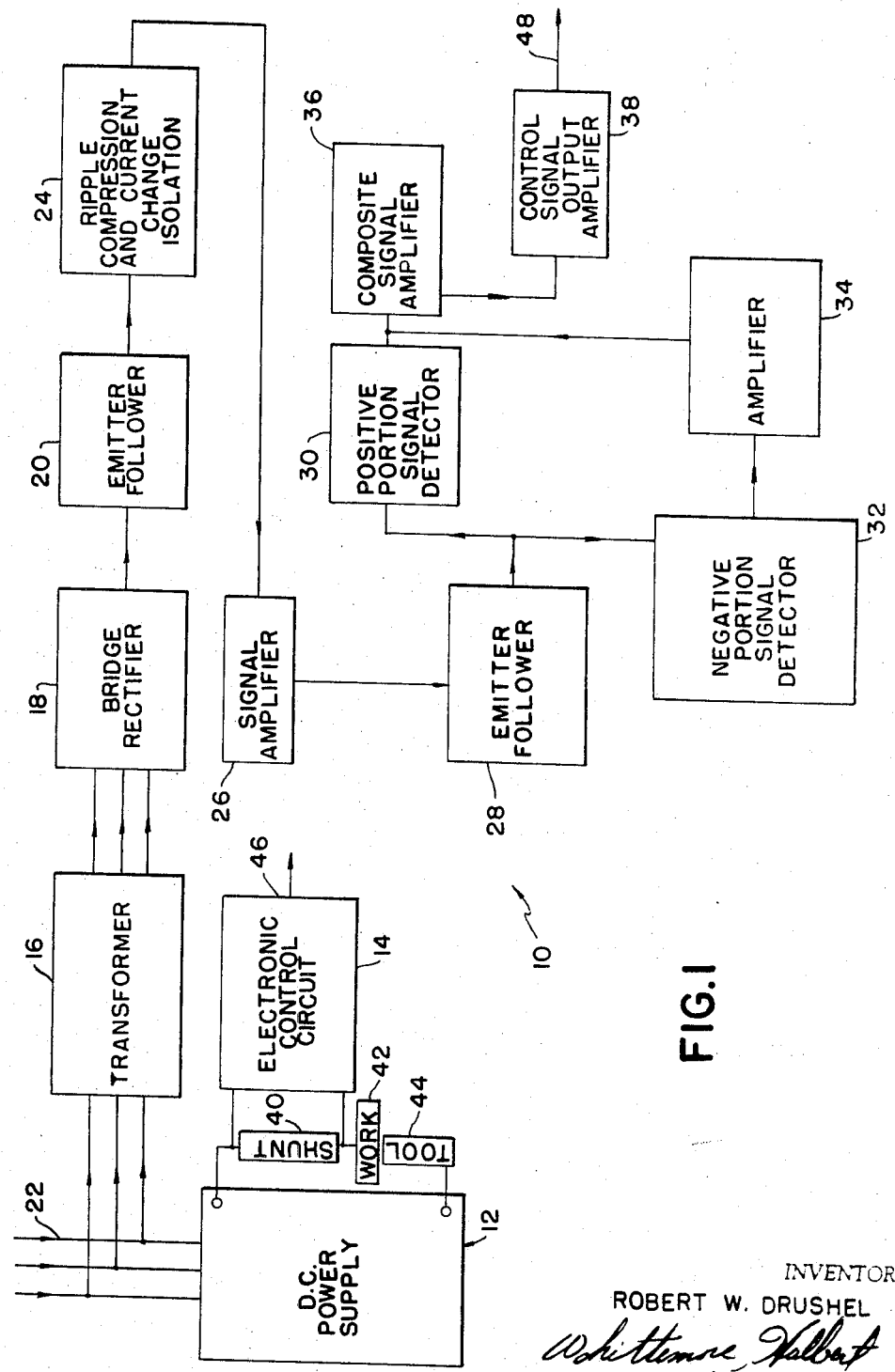
FIGURE 1 is a block diagram of the electronic control circuit of the invention illustrated in conjunction with electro-chemical machining apparatus.

As shown in FIGURE 1, the electronic control circuit of the invention 10 is illustrated connected to electrochemical machining apparatus 12 having in conjunction therewith an electronic control circuit 14. The electronic control circuit 10 includes a transformer 16, bridge rectifier 18 and emitter-follower 20 connected as shown, to the three-phase electric power line 22. The output signal from the emitter-follower 20 is passed through a ripple compression and current change isolation circuit 24, amplifier 26 and a second emitter-follower 28 in series, as shown. The signal from the emitter-follower 28 is passed through the positive portion signal detector 30 in parallel with the negative portion signal detector 32 which is in series with the amplifier 34 to drive the composite signal amplifier 36 which in turn drives the control signal output amplifier 38.

In operation the control circuit 10 senses a transient signal in the power line 22 and substantially immediately provides an output from the control signal output amplifier 38 which may be used to prevent the electronic control circuit 14 from shutting down the electro-chemical machining apparatus 12 due to the transient signal in the power line 22. The control signal output from the electronic control circuit 10 continues for the full duration of the transient signal in the power line 22 and for a predetermined time thereafter to allow the signal on the line 22 and across the gap between the work 42 and tool 44 to stabilize after a transient signal.

More specifically the electro-chemical machining apparatus 12 includes a direct current power supply which may provide for example ten thousand amperes at up to twenty volts through the shunt 40 and across the gap between the work 42 and tool 44. Also included in the electro-chemical machining apparatus 12 is some means for maintaining an electrolyte in the gap between the work 42 and tool 44 and for moving the tool and work relative to each other. Since electro-chemical machining apparatus is well known, the details of apparatus 12 will not be considered herein.

In operation of the electro-chemical machining apparatus 12 in accordance with the usual operation of such apparatus, a high current is passed between the tool 44 and work 42 in the presence of the electrolyte to rapidly and accurately shape the work in the form of the tool 44. The shaping of the work is very rapid and depends on many factors, including the power supply current and voltage and the pressure of the electrolyte and flow pattern thereof. Thus, shutting down of the apparatus 12 after a cut has been started in the work may result in damage to the work due to current and voltage characteristics and pressure and flow pattern of the electrolyte during shut down of the electro-chemical machining apparatus 12 or in restarting the apparatus 12. It is therefore undesirable to shut off the apparatus 12 in response to transient line signals in the power line 22.

It is however essential to turn the electro-chemical machining apparatus 12 off in response to certain electrical characteristics of the cutting circuit which may be sensed across the shunt 40 or across the gap between the tool 44 and work 42. Thus, sparking between the tool 44 and work 42 or impending sparking therebetween, short circuits between the work and tool and certain increases or decreases in voltage or current in the cutting circuit indicate cutting circuit conditions which would ruin the work in the apparatus 12 were not turned off.

The electronic control circuit 14 which may be for example the electronic control circuit disclosed in the above reference patent application is provided to sense undesirable cutting circuit conditions and to provide an output from the output conductor 46 in response thereto to turn off the electro-chemical machining apparatus 12. However, the electronic control circuit 14 cannot recognize whether an undesirable cutting circuit condition is due to permanent cutting circuit conditions or is due to a transient power line signal. Therefore, the electronic control circuit 14 through an output signal over conductor 46 will attempt to cut off the electro-chemical machining apparatus 12 in either case.

The electronic control circuit 10 is provided to sense the occurrence of a line transient signal on the power line 22 and provide a control signal output over the conductor 48 in response thereto before the transient signal is effective through the electronic control circuit 14 to shut the electro-chemical machining apparatus 12 off. The control signal output from the circuit 10 is then used to prevent shutting off of the electro-chemical machining apparatus 12 during the occurrence of the line transient signal and for a predetermined time thereafter which allows the signal in the power line 22 to stabilize after the occurrence of a transient signal.

The transformer 16 is a three phase step-down electrical transformer which may step the alternating electrical energy from the power line 22, which may be for example, but not limiting, the usual two hundred twenty, four hundred forty or six hundred sixty volts, down to a voltage whereby the signal output of the three-phase bridge rectifier 18 through the emitter-follower 20 will be suitable for use in transistor circuitry. For example, the output from the emitter-follower 20 will be a direct current signal having for example an approximate 12.5 average. The emitter-follower is provided to isolate the ripple compression and current change isolation circuit 24 and the following circuits of the electronic control circuit 10 from the effects of the transformer 16 and bridge rectifier 18.

The signal output from the emitter-follower 20 contains any transient signals which may appear on the power line 22. The signal from the emitter-follower 20 is provided substantially without time delay from the power line 22. In addition the signal from the emitter-follower 20 is substantially unchanged in characteristic from the signal on the power line 22. That is, the line transient signals are present along with any ripple, noise or other extraneous signals on the power line 22.

Each of the transformer, bridge rectifier and emitter-follower 16, 18 and 20 are well known circuits and will not therefore be considered in further detail herein.

Figure 2:
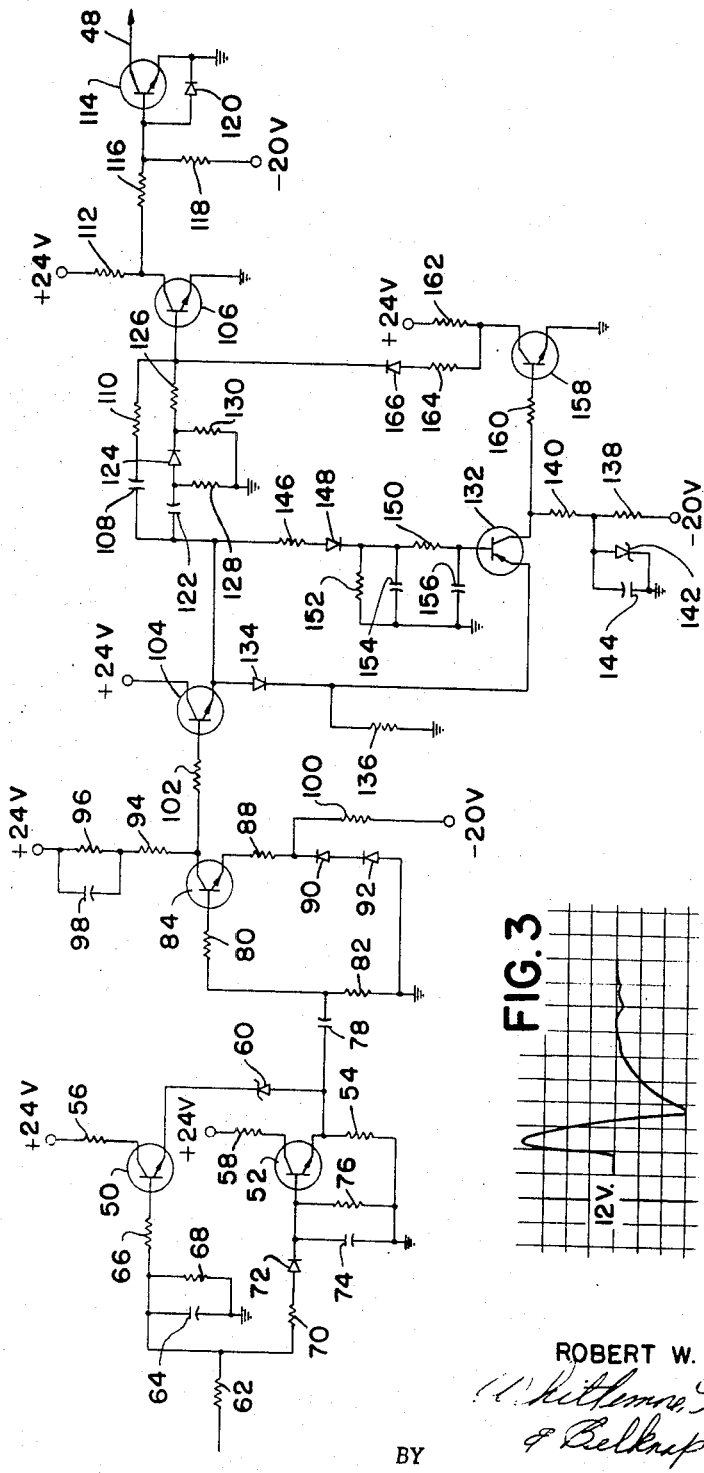
FIGURE 2 is a schematic diagram of a portion of the electronic control circuit illustrated in FIGURE 1.

The ripple compression and current change isolation circuit 24, along with the signal amplifier 26 are illustrated in detail in FIGURE 2. In addition, the operation of ripple compression and current change isolation circuit 24 and the signal amplifier 26 are considered in detail in the above referenced patent application.

As shown in FIGURE 2, the ripple compression and current change isolation circuit 24 includes the transistors 50 and 52 connected in slightly modified emitter-follower configuration with the same emitter resistor 54 and the small collector resistors 56 and 58. The emitters of the transistors 50 and 52 are separated by the Zener diode 60 to provide proper operating characteristics.

The signal from the emitter-follower 20 is fed directly to the base of the transistor 50 by a short time constant circuit consisting of the one thousand ohm resistance 62 and the one micro-farad capacitor 64 and through the resistor 66 and across the resistor 68, as shown. The same signal from the emitter-follower 20 is fed to the base of the transistor 52 through the same one thousand ohm resistor 62 through the one thousand ohm resistor 70, through the blocking diode 72 and across the five micro-farad capacitor 74 and resistor 76. Thus, it will be seen that in operation the emitter-follower, including the transistor 50, is driven through a short time constant being approximately one-tenth of the long time constant through which the emitter-follower, including the transistor 52 is driven.

The action of the ripple compression and current change isolation circuit 24 is to provide over the coupling capacitor 78 and through resistor 80 and across resistor 82 to the base of the transistor 84 of the amplifier 26 a signal which is substantially unchanged with respect to the transient line signals but in which the extraneous signals, such as ripple signals, noise and the like are suppressed. The action of the ripple compression and current change isolation circuit 24 may be considered similar to the action of a container having a floating top whereby the level of the water in the container is followed by the top while the ripples, waves or other disturbances on the surface of the water are dampened by the top. This action is due to the common emitter configuration of the emitter-follower transistors 50 and 52 and their being driven through different time constants.

The amplifier 26 besides including the transistor 84 and resistors 80 and 82 includes the emitter circuit having the resistor 88 and series diodes 90 and 92 therein and the collector circuit including the resistor 94 in series with the parallel combination of resistor 96 and capacitor 98. The resistor 96 as illustrated is connected to the same positive twenty-four volt electrical energy source that the resistors 56 and 58 of the emitter-followers of the ripple compression and current change isolation circuit 24 are connected to.

The amplifier 26 is biased to operate about a collector voltage of approximately twelve volts by means of the resistor 100 connected at one end between the emitter resistor 88 and the diode 90 and at the other end to a negative twenty volt electrical energy source. Thus, with no line transient signal, the signal from the amplifier 26 will be a steady direct current voltage of about twelve volts whereby no output will be provided over the conductor 48 from the control signal output amplifier.

Figures 3, 4:
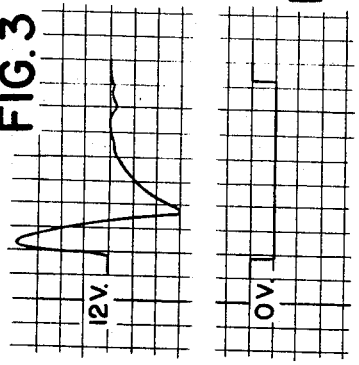
FIGURE 3 is a graphic representation of the transient signal input to a portion of the electronic control circuit 10.
FIGURE 4 is a graphic representation of the control signal output from the electronic control circuit 10 in response to the transient signal illustrated in FIGURE 3.

On occurrence of a line transient signal in the power line 22, for example, due to shutting off of a motor connected to the power line 22, a transient signal as indicated in FIGURE 3 will be present in the output of the amplifier 26 and will be fed across resistor 102 to the base of the transistor 104 of the emitter-follower 28. The transient signal illustrated in FIGURE 3 will first rise to a peak in a positive going portion and will then return toward and pass through and beyond the twelve volt normal signal in the output of the amplifier 26, after which the signal on the power line 22 due to this transient signal will stabilize again at the normal twelve volt steady direct current signal.

During the occurrence of such a transient signal it is desired to provide an output from the control signal output amplifier 38 over the conductor 48. Further, it will be understood that the output signal on the conductor 48 must be present before any electronic fault detecting circuit, such as the control circuit 14, can sense the transient signal and turn off the electro-chemical machining apparatus 12. In addition the output signal on the conductor 48 should be maintained until the line voltage on the power line 22 is stabilized and the gap conditions are stabilized to prevent turning off of the electro-chemical machining apparatus due to sensing of later portions of the transient signal illustrated in FIGURE 3.

In order to produce an output signal on the conductor 48 substantially immediately on occurrence of a transient signal on the power line 22, the signal from the emitter of the emitter-follower 28 which has its collector connected directly to the positive twenty-four volt electrical energy source is fed directly to the base of the transistor 106 of the composite signal amplifier 36 through the short time constant circuit including the one microfarad capacitor 108 and the one thousand ohm resistor 110 of the positive portion signal detector 30. Thus substantially immediately after the transient signal begins to rise, as indicated in FIGURE 3, the transistor 106 of the composite signal amplifier 36 which is in an off condition with no signal change through the emitter-follower 28 is turned on by the positive signal from the emitter of the transistor 104.

The output signal from the composite signal amplifier is taken across the collector resistor 112 which is connected between the collector of the transistor 106 and the positive twenty-four volt source of electrical energy. The emitter of the transistor 106 is connected directly to electronic common, as illustrated in FIGURE 2. Thus, on the positive signal being received by the composite signal amplifier 36, the positive twenty-four volts applied to the base of the transistor 114 through the resistor 116 and across the resistor 118 is caused to drop to a negative voltage due to the negative twenty volt power supply connected to the base of transistor 114 through the resistor 118 whereby the transistor 114 which is normally off with the positive voltage applied to the base thereof is turned on to place the output conductor 48 at electronic common. Diode 120 is provided between the base and emitter of the transistor 114 to provide proper operating conditions for the transistor 114.

As indicated above it will be understood that the returning of the collector of the transistor 114 to ground may be used as a control signal which is responsive to occurrence of a transient signal in the power line 22. This signal may be used in many ways. For example, in the present modification of the invention it is used to prevent shutting down of the electro-chemical machining apparatus 12 due to sensing of the line transient by the electronic control circuit 14. Actually the output signal from the electronic control circuit 14 is returned to electronic common during the occurrence of the transient signal in the power line to prevent any effective controlled use thereof, as during starting of the electro-chemical machining apparatus 12, as disclosed in the above referenced patent application.

While it is essential to turn the transistors 106 and 114 on as rapidly as possible in response to sensing of a line transient signal, it is just as essential to maintain the transistors on during the entire positive portion of the transient and for a predetermined time after the transient becomes negative going to allow the negative portion signal detector 32 to maintain the transistors 106 and 114 in an on condition. This desired result is accomplished by feeding the signal from the emitter of the emitter-follower 28 through the relatively long time constant circuit, including the ten micro-farad capacitor 122, diode 124 and resistors 126, 128 and 130. The diode 124 prevents undesirable interaction between the two time constant circuits in the positive portion signal detector 30, while the resistors 128 and 130 insure the transistor 106 will be maintained on for a predetermined time after the transient signal starts to go negative.

The negative portion signal detector 32 includes the transistor 132 having an emitter connected directly to the emitter of the emitter-follower 28 through the diode 134 and connected to ground through the resistor 136. The collector of the transistor 132 is connected to the minus twenty volt source of electrical energy through resistances 138 and 140. Desired voltage on the collector of the negative portion signal detector 32 is then established with the aid of the Zener diode 142 connected between the resistances 138 and 140 and the capacitor 144 in parallel with the Zener diode 142. The base of the transistor 132 is connected to the emitter of the transistor 104 of emitter-follower 28 through the series resistance 146, diode 148 and resistor 150. The parallel combination of resistor 152 and capacitor 154 is provided connected at one end between the diode 148 and the resistor 150 and electronic common at the other end. Resistor 146 is a twenty-two thousand ohm resistor and capacitor 154 is a ten microfarad capacitor. Resistance 152 is eighty-two thousand ohms, while the resistor 150 is one thousand ohms and capacitor 156 connected between the base of the transistor 132 and electronic common is a one micro-farad capacitor.

In operation of the negative portion signal detector 32 the transistor 132 is normally biased in the on condition since it is a negative base transistor, whereby a small positive signal is provided on the base of the transistor 158 of the amplifier 34. The transistor 158 which receives the positive signal from the negative portion signal detector 32 on its base through the resistor 160 and which has its emitter connected directly to electronic common and the collector connected through resistor 162 to the positive twenty-four volt source of electrical energy is normally operated at saturation. Therefore, there is normally no output signal therefrom over the resistor 164 and through isolating diode 166 to the base of transistor 106 of the composite signal amplifier 36.

When the signal at the emitter-follower 28 starts to go negative, as illustrated in FIGURE 3, the emitter of the transistor 132 is allowed to go negative faster than the base of the transistor 132 due to the long time constant of the resistor 146 and capacitor 154 in the base circuit. The transistor 132 will thus reach a stage very rapidly at which it will cut off. This stage is reached before the long time constant in the positive portion signal detector has discharged sufficiently due to the signal from the emitter-follower 28 going negative to cut off the composite signal amplifier 36.

On the transistor 132 cutting off, a negative bias is applied to the transistor 158, as established by the Zener diode 142, so that the transistor 158 will turn off and a large positive signal will be applied through the resistors 162 and 164 and diode 166 to the base of transistor 106. The composite signal amplifier 36 is thus maintained on even after the long time constant in the positive portion signal detector has timed out.

Further it will be noted that due to the long time constant established by the resistor 152 and capacitor 154, the transistor 132 will remain turned off for a predetermined period after the transient signal, as illustrated in FIGURE 3, has stopped going negative. Thus, the transistor 132 will remain turned off and the large positive signal will be fed to the composite signal amplifier 36 for a predetermined period after the treatment signal 22 has stopped going negative to maintain the output from the conductor 48 for a time sufficient to allow the signal on the line 22 and the signal across the gap between the work and tool to stabilize.

The relation between the line transient signal at the signal amplifier 26 and the signal from the control signal output amplifier 38 over the line 48 is indicated in FIGURES 3 and 4.

Thus in overall operation with the electro-chemical machining apparatus 12 operating normally, there will be no output signal from the electronic control circuit 14 on the conductor 46 tending to cutting the electro-chemical machining apparatus 12 off. On occurrence of a transient signal on the power line 22, the electronic control circuit 14 will sense the transient signal across the shunt 40 and would tend to cut the electro-chemical machining apparatus 12 off except for the action of the electronic control circuit 10.

Due to the provision of the electronic control circuit 10, the transient signal on the power line 22 is sensed through the transformer 16, bridge rectifier 18 and emitter-follower 20 to provide a signal suitable for use in transistor circuitry substantially undelayed in time and character from the transient signal on the power line 22. The signal provided by the emitter-follower 20 will contain ripple, noise, keying signals and the like which are undesirable and which are therefore compressed while the current change transient signal is isolated and amplified in the ripple compression and current change isolation circuits 24 and amplifier 26. Again the isolation of the transient signal is accomplished substantially without time delay or change in the characteristic thereof.

Immediately thereafter and before the electronic control circuit 14 provides an output on the conductor 46 to cut off the electro-chemical machining apparatus 12, the front portion of the transient signal, as indicated in FIGURE 3, is fed to the composite signal amplifier 36 from the emitter-follower 28 through the short time constant circuit of the positive portion signal detector 30, whereby the control signal output amplifier 38 provides an output on the conductor 48 which will prevent the signal appearing on the conductor 46 of the electronic control circuit 14 at a later time from cutting off the electro-chemical machining apparatus 12.

The signal output from the control signal amplifier 38 on conductor 48 is maintained due to the provision of the long time constant signal in the positive portion signal detector 30 which maintains the signal amplifier 36 on for a predeterimned time after the transient signal, as shown in FIGURE 3, starts to go negative, whereby the negative portion signal detector 32 is given time to develop a signal to maintain the composite signal amplifier 36 on in response to the negative going portion of the transient signal of FIGURE 3.

In addition, the signal from the control signal output amplifier 38 is maintained for a predetermined time after the transient signal has stopped going negative to permit the signal on the power line 22 and across the gap between the work and tool to stabilize. After this last predetermined time which is proportional to the magnitude of the transient signal the electronic control circuit 14 is again allowed to turn off the electro-chemical machining apparatus 12 in response to an undesirable operating condition as explained in the above referenced patent application.

It will thus be seen that a particularly simple, economical and efficient electronic control circuit has been provided capable of sensing power line transient signals of relatively small magnitude and providing a control signal output in response thereto for the duration of line and gap disturbance thereby. Thus, turning off or turning on other apparatus which tends to disrupt normal power line characteristics need no longer affect operating equipment, such as the electro-chemical machining apparatus 12 connected to the power line.

While one embodiment of the present invention has been considered in detail, it will be understood that other embodiments and modifications thereof are contemplated. It is the intent to include all embodiments and modifications as are defined by the appended claims within the scope of the invention.

What I claim as my invention is:

1. An electronic control circuit comprising means for receiving an input transient signal and means for providing an output signal in response thereto including means for providing an output signal substantially immediately in response to a positive going transient signal and for a predetermined time after the transient signal is no longer positive going, including a short time constant circuit connected to the means for receiving the transient signal, a long time constant circuit connected in parallel with the short time constant circuit and amplifying means connected to the parallel time constant circuits to receive the output thereof and means also connected to the means for receiving the transient signal for providing an output signal in response to a negative going transient signal portion and for a predetermined time after the transient signal is no longer negative going.

2. Structure as set forth in claim 1 wherein the means for providing an output signal in response to a negative going transient signal portion includes a normally saturated transistor, amplifying means connected to be driven by the saturated transistor on turning off of the saturated transistor and normally on transistor means for driving the saturated transistor into an off condition in response to being turned off and means in the emitter base circuit of the normally on transistor for receiving a negative going transient signal portion from the means for receiving the transient signal for turning the normally on transistor off during the negative going transient signal portion and for a predetermined time thereafter.

3. An electronic control circuit comprising means for receiving an input transient signal, and means for providing an output signal in response thereto including means for providing an output signal substantially immediately in response to a positive going transient signal and for a predetermined time after the transient signal is no longer positive going and means also connected to the means for receiving the transient signal for providing an output signal in response to a negative going transient signal portion and for a predetermined time after the transient signal is no longer negative going, including a normally saturated transistor, amplifying means connected to be driven by the saturated transistor on turning off of the saturated transistor and normally on transistor means for driving the saturated transistor into an off condition in response to being turned off and means in the emitter base circuit of the normally on transistor for receiving a negative going transient signal portion from the means for receiving the transient signal for turning the normally on transistor off during the negative going transient signal portion and for a predetermined time thereafter.

4. An electronic control circuit for providing a control signal output in response to a transient signal in an electric circuit comprising isolated means for sensing the transient signal, means connected to the means for sensing the transient signal for providing a control signal output substantially immediately on receipt of the transient signal in response to an initial excursion of one polarity of the transient signal and for maintaining the control signal output at least during the initial one polarity excursion of the transient signal and separate means operably associated with the means responsive to the initial excursion of one polarity of the transient signal for maintaining the control signal output in response to the initial excursion of the transient signal of a polarity opposite the one polarity.

5. Structure as set forth in claim 4 wherein the means for sensing the transient signal comprises a transformer, a rectifier and an emitter follower connected in series.

6. Structure as set forth in claim 4 wherein the means for immediately providing and maintaining the control signal output during the initial one polarity excursion of the transient signal includes separate first means for providing an output signal substantially immediately on receipt of the transient signal and separate second means for maintaining the control signal.

7. Structure as set forth in claim 6 wherein all the means for maintaining the control signal output are connected in parallel.

8. Structure as set forth in claim 6 wherein the second means is effective to maintain the control signal output for a predetermined time after the initial excursion of the transient signal of one polarity.

9. Structure as set forth in claim 4 and further including means operably associated with the separate means for maintaining the control signal output for a predetermined time after the initial excursion of the transient signal of a polarity opposite the one polarity.

10. Structure as set forth in claim 4 and further including structure for compressing and isolating the sensed transient signal from other extraneous signals before the control signal output is provided therefrom.

11. Structure as set forth in claim 10 wherein the means for compressing and isolating the transient signal from the extraneous signals includes a pair of emitter followers connected with a common emitter and a Zener diode positioned between the emitters of the emitter followers.

12. Structure as set forth in claim 11 wherein the means for compressing and isolating the transient signal from the extraneous signals further includes a relatively short time constant input circuit to one of the emitter followers and a relatively long time constant input circuit to the other of the emitter followers.

13. The method of providing a control signal output in response to a transient signal in an electronic circuit comprising sensing the transient signal and substantially immediately providing a control signal output in response thereto, separately maintaining the control signal output at least during the initial excursion of the transient signal of one polarity and subsequently separately maintaining the control signal output in response to the initial excursion of the output signal of a polarity opposite the one polarity.

14. The method as set forth in claim 13 and further including maintaining the output signal in response to the initial excursion of the transient signal of one polarity for a predetermined time after the transient signal has completed its initial excursion of one polarity.

15. The method as set forth in claim 13 and further including maintaining the control signal output for a predetermined time after the initial excursion of the transient signal of a polarity opposite the one polarity.

16. The method as set forth in claim 13 and further including compressing and isolating the transient signal from extraneous signals before providing and maintaining the control signal output.

References Cited

UNITED STATES PATENTS

| 2,959,716 | 11/1960 | Gordon | 317—49 X |
|---|---|---|---|
| 3,214,677 | 10/1965 | Baude | 317—49 X |
| 3,277,344 | 10/1966 | Mathews | 317—49 X |
| 3,344,318 | 9/1967 | Wolff | 317—49 X |

JOHN F. COUCH, Primary Examiner

R. V. LUPO, Assistant Examiner

U.S. Cl. X.R.

317—33, 50